C. KRÄMER.
CONVERTER.
APPLICATION FILED NOV. 22, 1909.
1,096,923.
Patented May 19, 1914.
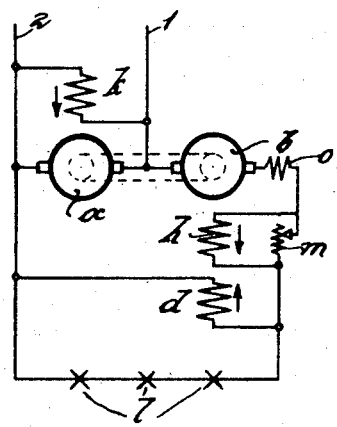
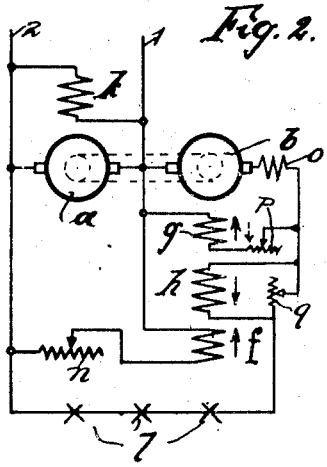

UNITED STATES PATENT OFFICE.

CHRISTIAN KRAMER, OF FRANKFORT-ON-THE-MAIN, GERMANY, ASSIGNOR, BY MESNE ASSIGNMENTS, TO GENERAL ELECTRIC COMPANY, A CORPORATION OF NEW YORK.

CONVERTER.

1,096,923. Specification of Letters Patent. Patented May 19, 1914.

Application filed November 22, 1909. Serial No. 529,407.

*To all whom it may concern:*

Be it known that I, CHRISTIAN KRÄMER, a subject of the German Emperor, and a resident of Frankfort-on-the-Main, Germany, have invented certain new and useful Improvements in or Relating to Converters, of which the following is a specification.

This invention relates to an arrangement for obtaining from a source of a practically constant pressure a current of practically constant strength independent of the external resistance.

According to this invention in series with the current consuming apparatus or working circuit to which practically constant current must be supplied, is connected a generator for a practically constant current. This constant current generator produces a field which acts in opposition to a field which is obtained by the joint action of the terminal pressure of the machine, and of an independent electromotive force, so that the field produced by the above three causes, always adjusts the electromotive force of the machine to such a value that the current passing through the machine retains approximately the same value. This is accomplished by causing the resultant field to have a predetermined value, for instance, zero, when a predetermined current traverses the working circuit. It will be noted that the field set up in the generator is the algebraic sum of a constant field, a field proportional to the current, and a field proportional to the voltage of said generator.

Two methods according to this invention of connecting the continuous current machine are illustrated in the accompanying drawing, in which—

Figure 1 is a diagram showing one form of this invention, and Fig. 2 is a diagram showing another form.

In Fig. 1 a continuous current motor $a$ excited by the shunt winding $k$ is connected to an ordinary constant potential continuous current supply circuit 1, 2, and drives the booster $b$, which regulates the strength of current in the constant current consuming or working circuit indicated by the arc lamps $l$. The booster is provided with a field winding $h$ through which passes the series current or a part thereof and which is adapted to induce in the armature of $b$ an electromotive force which opposes that of the supply circuit, and a field winding $d$ acting in opposition to $h$, the exciting pressure of which is the algebraical sum of the constant E. M. F. to which the machine $a$ is connected, and the terminal pressure of the machine $b$. If the variable resistance in the current consumption circuit is of such value that the pressure of the supply circuit will maintain the admissible current which is to be kept constant, the series winding $h$ will exactly neutralize the field produced by the winding $d$, and the electromotive force of the booster $b$ will be zero. If the resistance in the current consumption circuit drops, the machine $b$, under the preponderating influence of the series winding $h$ develops a counter electromotive force which at once limits the strength of current. If, on the contrary, the resistance in the current consumption circuit rises, the machine $b$, under the preponderating influence of the winding $d$, develops an electromotive force in the opposite direction, which is added to that of the supply current and prevents the strength of current from falling.

According to Fig. 2, the field due to the two electromotive forces, namely the independent electromotive force and the terminal pressure of the machine $b$, instead of being set up in one and the same winding $d$, can be set up by separate windings $f$ and $g$.

The strength of current which is to be maintained constant, can be adjusted at will in any desired manner, for instance by the adjustable shunt $m$ to the series winding $h$ as shown in Fig. 1, or by the regulating resistance $n$ connected in series to the winding $f$, and shown in Fig. 2. The other windings can also be made adjustable in any suitable manner as by rheostats $p$ and $q$ Fig. 2, and it is advisable to provide the machine $b$ with an interpole winding $o$.

Converters of the kind described are of particular importance for feeding single motors without special starting devices, for working rolling mill motors or hoisting motors and for supplying arc light circuits and other circuits with a limited strength of current.

I claim:

1. The combination with a constant potential supply circuit, and a constant current working circuit, of a motor generator having its motor connected to said supply circuit and its generator permanently connected in circuit with said working circuit, and means for setting up in said generator a field which is the algebraic sum of a field proportional to the current of said generator and an opposing field proportional to the voltage of the supply circuit and the voltage of said generator.

2. The combination with a constant potential supply circuit and a constant current working circuit, of a motor generator having its motor connected to said supply circuit and its generator permanently connected in circuit with said working circuit, a field winding for said generator receiving a current proportional to the current of said generator, and an opposing field winding for said generator receiving a current proportional to the sum of the voltages of the generator and supply circuit.

3. The combination with a constant potential supply circuit and a constant current working circuit, of a motor generator having its motor connected to said supply circuit and its generator permanently connected in circuit with said working circuit, a field winding for said generator connected in series therewith, and an opposing field winding for said generator connected to one of the terminals of the generator and supply circuits respectively to receive the sum of their voltages.

4. The combination with a motor generator set and means connecting one of the terminals of the generator with one of the terminals of the motor, of a constant potential supply circuit having one of its terminals connected to one of the motor terminals and the other terminal connected to the junction of the motor and generator terminals, a constant current working circuit connected to the other terminals of the motor and generator respectively which are not connected together, a field winding for said generator connected in series therewith, and an opposing field winding connected across the last named terminals of the motor and generator.

In testimony whereof I have signed my name to this specification in the presence of two subscribing witnesses.

CHRISTIAN KRÄMER.

Witnesses:
ERWIN DIPPEL,
CARL GRUND.